(12) United States Patent
Huang et al.

(10) Patent No.: US 11,321,421 B2
(45) Date of Patent: May 3, 2022

(54) METHOD, APPARATUS AND DEVICE FOR GENERATING ENTITY RELATIONSHIP DATA, AND STORAGE MEDIUM

(71) Applicant: BEIJING BAIDU NETCOM SCIENCE AND TECHNOLOGY CO., LTD., Beijing (CN)

(72) Inventors: Fang Huang, Beijing (CN); Shuangjie Li, Beijing (CN); Bingyang Yu, Beijing (CN); Yabing Shi, Beijing (CN); Haijin Liang, Beijing (CN); Yang Zhang, Beijing (CN); Yong Zhu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 422 days.

(21) Appl. No.: 16/539,796

(22) Filed: Aug. 13, 2019

(65) Prior Publication Data
US 2020/0057788 A1 Feb. 20, 2020

(30) Foreign Application Priority Data
Aug. 15, 2018 (CN) .......................... 201810928930.1

(51) Int. Cl.
*G06F 16/958* (2019.01)
*G06F 16/953* (2019.01)
(52) U.S. Cl.
CPC .......... *G06F 16/972* (2019.01); *G06F 16/953* (2019.01)
(58) Field of Classification Search
CPC .............................. G06F 16/972; G06F 16/953
(Continued)

(56) References Cited

U.S. PATENT DOCUMENTS 8,555,157 B1 * 10/2013 Fu .......................... G06F 16/972
715/201
8,793,273 B1 7/2014 Sadovsky
(Continued)

FOREIGN PATENT DOCUMENTS

CN 104516949 A 4/2015
CN 104933168 A 9/2015
(Continued)

OTHER PUBLICATIONS

Korean Patent Application No. 10-2019-0085858 English translation of Office Action dated Sep. 25, 2020, 6 pages.
(Continued)

*Primary Examiner* — Mark E Hershley
(74) *Attorney, Agent, or Firm* — Lathrop GPM LLP

(57) ABSTRACT

Embodiments of the present disclosure provide a method, an apparatus and a device for generating entity relationship data, and a storage medium. The method includes: obtaining webpage source data corresponding to a target webpage; identifying at least one key value block from the webpage source data, wherein the key value block comprises at least one key value pair; identifying body values corresponding to the at least one key value block from the webpage source data; and generating entity relationship data corresponding to the target webpage according to the key value blocks and the body values corresponding to the key value blocks. With the technical solution the present disclosure, the webpage universality may be improved, labor cost may be reduced, and output quantity of the entity relationship data may be increased.

15 Claims, 7 Drawing Sheets

(58) Field of Classification Search
USPC .......................................................... 707/706
See application file for complete search history.

(56) References Cited

U.S. PATENT DOCUMENTS

| | | | | |
|---|---|---|---|---|
| 8,826,443 | B1* | 9/2014 | Raman | G06F 11/004 726/26 |
| 8,843,490 | B2 | 9/2014 | Gazen et al. | |
| 10,289,658 | B1* | 5/2019 | Chen | G06F 40/106 |
| 10,810,110 | B1* | 10/2020 | Thomas | G06F 11/3664 |
| 2003/0221162 | A1* | 11/2003 | Sridhar | G06F 16/972 715/229 |
| 2008/0005086 | A1* | 1/2008 | Moore | G06F 16/955 707/E17.112 |
| 2010/0057586 | A1* | 3/2010 | Chow | G06Q 30/0623 705/26.1 |
| 2010/0169311 | A1* | 7/2010 | Tengli | G06F 16/951 707/E17.108 |
| 2011/0161375 | A1* | 6/2011 | Tedder | G06F 16/958 715/234 |
| 2011/0314092 | A1* | 12/2011 | Lunt | H04L 67/30 715/234 |
| 2013/0031457 | A1* | 1/2013 | Griffiths | G06F 40/169 715/231 |
| 2013/0086224 | A1* | 4/2013 | Teraguchi | G06F 11/0775 709/219 |
| 2013/0268357 | A1* | 10/2013 | Heath | G06Q 10/10 726/26 |
| 2014/0006951 | A1* | 1/2014 | Hunter | H04N 21/8166 715/719 |
| 2014/0201331 | A1* | 7/2014 | Kershaw | G06F 16/9027 709/219 |
| 2015/0363304 | A1* | 12/2015 | Nagamalla | G06F 11/3648 702/123 |
| 2016/0132572 | A1 | 5/2016 | Chang et al. | |
| 2016/0337401 | A1* | 11/2016 | Bendersky | H04L 63/0254 |
| 2017/0091270 | A1* | 3/2017 | Guo | H04L 67/306 |
| 2019/0340273 | A1* | 11/2019 | Raman | H04L 41/0896 |

FOREIGN PATENT DOCUMENTS

| | | |
|---|---|---|
| CN | 107169079 A | 9/2017 |
| CN | 107590219 A | 1/2018 |
| CN | 108363816 A | 8/2018 |
| CN | 109325201 A | 2/2019 |
| JP | 2005530224 A | 10/2005 |
| JP | 2007094775 A | 4/2007 |
| JP | 2010198058 A | 9/2010 |
| JP | 2010237867 A | 10/2010 |
| KR | 20130037975 A | 4/2013 |
| WO | WO 2008146807 A1 | 12/2008 |

OTHER PUBLICATIONS

Korean Patent Application No. 10-2019-0085858 Office Action dated Sep. 25, 2020, 7 pages.
Japanese Patent Application No. 2019-143724 English translation of Office Action dated Sep. 29, 2020, 5 pages.
Japanese Patent Application No. 2019-143724 Office Action dated Sep. 29, 2020, 5 pages.
Chinese Patent Application No. 201810928930.1 English translation of First Office Action dated Aug. 14, 2020, 13 pages.
Chinese Patent Application No. 201810928930.1 First Office Action dated Aug. 14, 2020, 12 pages.
Web entity information extraction based on DOM tree and XSL, pp. 39-69, Mar. 2016.
Web entity information extraction based on DOM tree and XSL, pp. 39-69, Mar. 2016, English translation.
European Patent Application No. 19189957.4,extended Search and Opinion dated Jan. 9, 2020, 7 pages.

* cited by examiner

METHOD, APPARATUS AND DEVICE FOR GENERATING ENTITY RELATIONSHIP DATA, AND STORAGE MEDIUM

CROSS REFERENCE TO RELATED APPLICATIONS

This application is based on and claims priority to Chinese patent application Serial No. 201810928930.1, filed on Aug. 15, 2018, the entire contents of which are incorporated herein by reference.

FIELD

The present disclosure relates to the field of information processing technologies, and more particularly to a method, an apparatus and a device for generating entity relationship data and a storage medium.

BACKGROUND

Entity relationship data, also referred to as SPO triplet data, refers to a triple consisting of an entity pair (subject S-object O pair) and a relationship therebetween. The entity relationship is a key part of a knowledge graph. From the perspective of the knowledge graph, mining the entity relationship can enrich relationship knowledge in the graph, constructing association relationship between entities. From the perspective of product, the entity relationship, on the one hand, can directly satisfy search requirement of users for knowledge. For example, when the wife of a certain star "the wife of xxx" is searched for, the question can be directly given through the entity relationship data. In addition, on the other hand, associated knowledge can be recommended to users based on the entity relationship, providing information-extended reading experience for the users. For example, when the name "xx" of a certain famous person is searched for, other entities associated with the famous person may be recommended to the user based on the entity relationship.

In the related art, mining the entity relationship is mainly performed by the following two ways.

In the first way, extraction is performed with respect to encyclopedia websites. Since the encyclopedia website has good structure, and data thereof is normalized, the entity relationship may be directly extracted from an information box or an attribute table (a kind of webpage structure for describing entity attributes under the entity of the encyclopedia website). Using the characteristic of simple and stable structure of the encyclopedia website, several typical pages are sampled and labeled from the encyclopedia website to be extracted, and one or more patterns represented by class xpath are constructed automatically by performing a pattern learning algorithm on these pages. Then, the patterns are applied to other detail pages of the website to realize extraction.

In the second way, a packager is generated with respect to the website, and extraction is performed using the packager. By analyzing information such as the structure and the HTML tag of the website to be extracted, the corresponding packager is constructed, and the entity relationship extraction is performed on the website by using the packager. For a general and organized page, the packager usually writes xpath and CSS selector expression dependent on the manual use regular expression, to extract elements in the webpage.

Disadvantages in the related art are in that, in the first way, the amount of data that can be extracted is small, and the time effectiveness of the data is not strong; and in the second way, the labor cost is very high and the universality is not strong.

SUMMARY

The present disclosure provides a method, an apparatus and a device for generating entity relationship data and a storage medium, which improves webpage universality, reduces labor cost, and increases output quantity of entity relationship data.

In a first aspect, embodiments of the present disclosure provide a method for generating entity relationship data. The method includes:

obtaining webpage source data corresponding to a target webpage;

identifying at least one key value block from the webpage source data, wherein the key value block comprises at least one key value pair;

identifying body values corresponding to the at least one key value block from the webpage source data; and generating entity relationship data corresponding to the target webpage according to the key value blocks and the body values corresponding to the key value blocks.

In a second aspect, embodiments of the present disclosure further provide an apparatus for generating entity relationship data. The apparatus includes:

a source data obtaining module, configured to obtain webpage source data corresponding to a target webpage;

a key value block identifying module, configured to identify at least one key value block from the webpage source data, wherein the key value block comprises at least one key value pair;

a body value identifying module, configured to identify body values corresponding to the at least one key value block from the webpage source data; and a data generating module, configured to generate entity relationship data corresponding to the target webpage according to the key value blocks and the body values corresponding to the key value blocks.

In a third aspect, embodiments of the present disclosure further provide a computer device. The computer device includes one or more processors and a storage device. The storage device is configured to store one or more programs. When the one or more programs are executed by the one or more processors, the one or more processors are caused to implement the method for generating entity relationship data according to the first aspect.

In a fourth aspect, embodiments of the present disclosure further provide a computer readable storage medium having a computer program stored thereon. The computer program is configured to implement the method for generating entity relationship data according to the first aspect when executed by a processor.

With embodiments of the present disclosure, by obtaining the webpage source data corresponding to the target webpage, and by identifying the at least one key value block included in the webpage source data and the body values corresponding to respective key value blocks, the entity relationship data corresponding to the target webpage may be generated according to the respective key value blocks and their body values. Since the entity relationship is identified from the webpage source data, it is not limited by the webpage type, the webpage structure, the site and the like, and the entity relationship data may be extracted from the webpage automatically, which does not need much human maintenance. Moreover, a great amount of entity relationship data may be obtained while performing extraction from the huge amount of Internet webpages, thereby improving the webpage universality, reducing labor cost, and improving the output quantity of the entity relationship data.

DETAILED DESCRIPTION

Figure 1A:
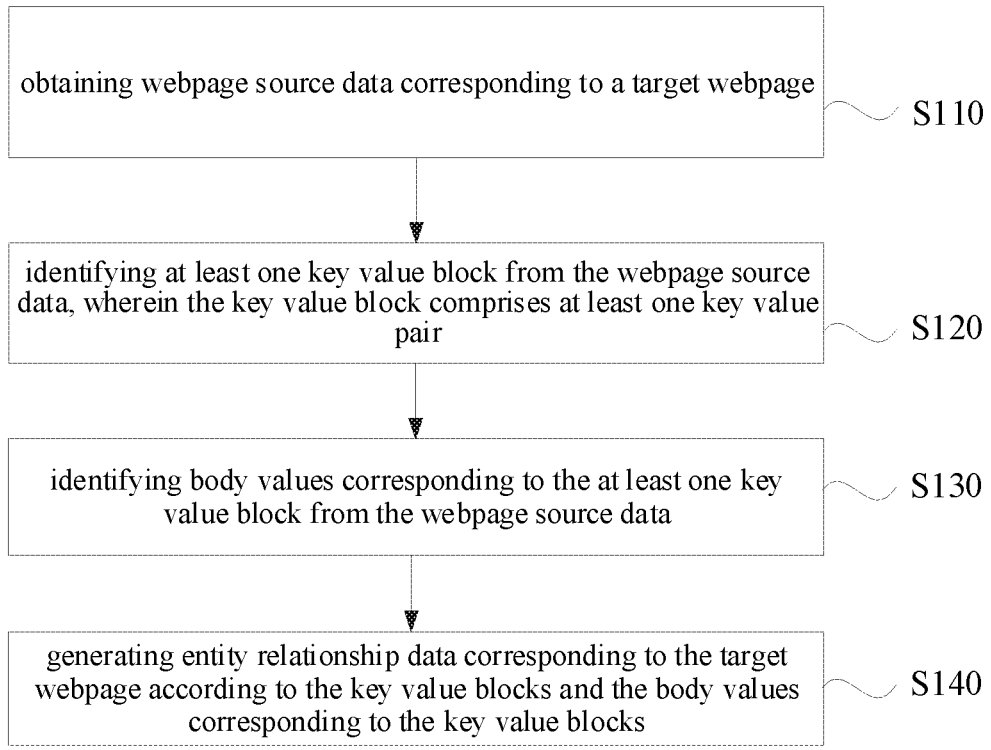
FIG. 1a is a flow chart illustrating a method for generating entity relationship data provided in Embodiment 1 of the present disclosure.

Detailed description will be further made below to the present disclosure with reference to the accompanying drawings and the embodiments. It should be understood that, detailed embodiments described herein are intended only to explain the present disclosure, and are not intended to limit the present disclosure. In addition, it should be further noted that, for the convenience of description, only some contents but not all of the structure related to the present disclosure are illustrated in the accompanying drawings.

It should be further noted that, for convenience of description, merely part related to the present disclosure but not all of the content is illustrated in the drawings. Before discussing exemplary embodiments in more detail, it should be noted that, some exemplary embodiments are described as processing or method depicted as flow charts. Although various operations (or steps) are depicted as sequential processing in the flow chart, many operations may be implemented concurrently, in parallel, or simultaneously. Moreover, the sequence of various operations may be rearranged. When the operations are completed, the processing may be terminated. However, there may also be additional steps not included in the drawings. The processing may be corresponding to methods, functions, routines, subroutines, subprograms, and the like.

Embodiment 1

FIG. 1a is a flow chart illustrating a method for generating entity relationship data provided in Embodiment 1 of the present disclosure. This embodiment may be applicable to a situation in which entity relationship data is obtained from a webpage. This method may be executed by an apparatus for generating entity relationship data provided by embodiments of the present disclosure, which may be formed by hardware and/or software, and generally, may be integrated in a computer device. As illustrated in FIG. 1a, the method in this embodiment includes the following.

At block S110, webpage source data corresponding to a target webpage is obtained.

In this embodiment, the target webpage may be any webpage on the Internet, and the webpage source data may be source code data of the target webpage. Since there are various kinds of webpages on the Internet, the webpage obtained may be pre-processed first, to improve a reliability and an effectiveness of the obtained webpage source data.

In detail, the webpage source data corresponding to the target webpage may be obtained as follows. Source code data corresponding to the target webpage is obtained from a webpage base according to a URL (Uniform Resource Locator) of the target webpage, as source code data to be verified. When it is determined that the source code data to be verified does not satisfy a webpage filtering condition, the source code data to be verified is used as the webpage source data of the target webpage. The webpage base is prestored with source code data corresponding to a plurality of webpages. The webpage filtering condition includes but is not limited to, a site where the webpage is located being a backlist site, a quality rating of the webpage being less than a preset threshold, a language of the webpage being a foreign language, the webpage being a pornographic webpage, and a type of the webpage being a picture type. The source code data may be referred to as ulpack data, which may be obtained from the webpage base by tools such as wdbtools. In addition, filtering the source code data to be verified may be implemented by tools such as Nlpc antiporn.

Alternatively, in order to obtain the entity relationship data included in the webpage more comprehensively, after obtaining the webpage source data corresponding to the target webpage, the method further includes: from a click display log of a search engine, obtaining at least one query corresponding to the URL of the target webpage, and associating the obtained at least one query with the webpage source data.

The click display log may be a log recorded with respect to webpages opened by click in various displayed webpages, after the user inputs the query. The query may be query data, and the purpose of obtaining the at least one query data corresponding to the URL of the target webpage is providing more reference for identifying body values in subsequent steps. Moreover, illegal webpages may be further filtered by identifying illegal expressions from the obtained query. Finally, by combing the query and the webpage source data corresponding to the same URL, the relationship between the query and the webpage source data is established.

Figure 1B:
FIG. 1b is a flow chart illustrating a method for pre-processing webpage data applicable to Embodiment 1 of the present disclosure.

As an example, as illustrated in FIG. 1b, pre-processing the URL of the target page may be completed by three steps as follows:

Obtaining ulpack data: obtaining ulpack data corresponding to the URL of the target webpage in the webpage base;

Webpage filtering: after obtaining the data of the webpage base, performing filtering according to information such as site where the webpage is located, the quality of the webpage, the language of the webpage, whether being a pornographic webpage, and a type of the webpage;

Filtering pornographic queries and query combining: obtaining the search query of the URL, performing pornographic query identification according to the URL for further filtering the pornographic webpages, and combining the queries and the webpage data after filtering the pornographic queries.

At block S120, at least one key value block is identified from the webpage source data, in which the key value block includes at least one key value pair.

In this embodiment, the key value pair may be KV type text data, and at least one KV type text data may form one key value block. For example, when the webpage information includes "sex: female", it may be identified as one key value pair by analyzing the webpage source data. One key value pair may include one key name and one key value, in which, the key name (K) may for example be "sex", and the key value (V) may for example be "female".

In detail, from the webpage source data, at least one key value pair may be identified by using the key value pair as the minimum identification unit, and then these key values may be divided according to a preset division rule to obtain at least one key value block. The advantage of such a setting is reducing processing objects in the subsequent steps and improving the processing efficiency.

The way for identifying the KV type text data from the webpage source data may include, but not limited to, identifying through tools, identifying according to existing identification result, and identifying through specific tags, etc.

At block S130, body values corresponding to the at least one key value block are identified from the webpage source data.

In this embodiment, the body value corresponding to the key value block may be the subject (S) in the entity relationship data. The body value may be identified as follows. An appropriate webpage node may be found for the key value block according to the webpage type, the type of the key value block and the xpath template of the site where the target webpage is, and used as the body value. The xpath is a path language of a subset of standard generalized markup language (extensible markup language, XML), which is a language used for determining location of a certain part in the XML document.

The way for identifying the body value corresponding to each key value block may include, but not limited to, identifying the body value based on the entity page, identifying the body value based on a strongly styled node, identifying the body value based on a whitelist, identifying the body value based on the query, and identifying the body value based on a site template.

For example, when the webpage information includes "sex: female; age: eighteen; graduation time: June, 2018", and the corresponding character name is "Zhang Xiaoting", the previous detail information is used as one key value block, and "Zhang Xiaoting" is used as the body value corresponding to the key value block.

Alternatively, the body values corresponding to the at least one key value block may be identified from the webpage source data as follows. When it is determined that the target key value block currently processed is the main key value block, and the webpage source data includes the entity page node satisfying the first label condition, it is determined whether the target webpage is the entity page according to the entity page evaluation rule. When the target webpage is the entity page, the text data corresponding to the entity page node is used as the body value of the target key value block. The main key value block is the key value block including the most key value pairs in the at least one key value block corresponding to the webpage source data.

As an example, identifying the body value based on the entity page includes two steps: first determining whether the webpage is the entity page, and then performing body value identification on the entity page. The entity page may be determined as follows. A weighted score is obtained based on text features in the page, and the page whose score exceeds the threshold is determined as the entity webpage.

In a specific example, the text features in the page include whether there are some key words (for example, abstract, overview, etc.) in the page, whether there is text describing the score (for example, rating, scoring, etc.), the length of the title, whether the title coincides with the text in the page, the word frequency, and the like. The weighted score is obtained as follows. A different weight is assigned for each text feature (typically, the weight may be set manually by performing sampling statistics on the discrimination of respective features), to perform the weighted scoring.

After determining that the target webpage is the entity page, the body value of the entity page may be identified as follows. The text data corresponding to the entity page node in the webpage source data is directly used as the body value of the target key value block currently identified. The entity page node, for example, may be the node having the <h1> tag in the webpage source data. In addition, it should be noted that, the target key value block currently identified should be the key value block having the most key value pairs in the plurality of key value blocks corresponding to the webpage source data, i.e., the main key value block. Such setting aims at avoiding that the content information corresponding to some small key value blocks is identified as the content corresponding to the headline of the target webpage, thereby improving the accuracy of identifying the body values.

Alternatively, the body values corresponding to the at least one key value block may be identified from the webpage source data as follows. The strongly styled node satisfying the second label condition is searched for forwards in the webpage source data according to the page location of the target key value block currently processed in the target webpage. When the strongly styled node is found, and the xpath of the strongly styled node is not consistent with the xpath corresponding to the target key value block, the text data corresponding to the strongly styled node is used as the body value corresponding to the target key value block.

As an example, in the body value identification based on strongly styled node, the strongly style nodes satisfying the second label condition in the webpage are searched for forwards, and the text data corresponding to the strongly styled node satisfying a certain rule is used as the body value of the key value block. The strongly styled node, for example, may be the node having the <strong> label or <h1>~<h7> label. When the xpath of the strongly styled node is not consistent with the xpath corresponding to the key value block, it indicates that the level of the strongly styled node is higher than that of the key value block. Since the strongly styled node is found by performing searching forwards from the location of the key value block in the webpage, the strongly styled node is very likely to be the title information of the content corresponding to the key value bock. Thus, using the text data corresponding to the strongly styled node as the body value of the key value block reduces the rate of error identification of the body value.

Alternatively, the body values corresponding to the at least one key value block may be identified from the webpage source data as follows. The key name of the key value pair included in the target key value block currently processed is matched with the preset whitelist. When it is determined that the target key name included in the target key value block matches the whitelist, the target key value corresponding to the target key name is obtained as the body value of the target key value block.

As an example, since the key names of some key value pairs in the key value block have obvious characteristics, for example, the corresponding object value in the entity relationship of the name class has obvious characteristics, the key value corresponding to the key name having the obvious characteristic may be directly used as the body value. For example, key names having obvious characteristics, such as "name" and "film name" may be preset in the whitelist, and when the key value pair "name: Zhang Xiaoting" is included in the key value block, the key value "Zhang Xiaoting" corresponding to the key name "name" may be directly used as the body value of the key value block.

Alternatively, the body values corresponding to the at least one key value block may be identified from the webpage source data as follows. When the target key value block currently processed is the main key value block, a target word is determined according to word frequencies of respective words in the at least one query associated with the webpage source data. At least one query is found from the webpage source data, the text data of which and the target word satisfy a similarity condition. When the xpath of the found query node is different from the xpath corresponding to the target key value block currently processed, and the page location of the query node and the page location of the target key value block satisfy a preset distance condition, the text data of the query node is used as the body value of the target key value block.

As an example, the body value identification based on the query is defined with respect to the main key value block. Since the query of one URL should be highly associated with the content of the page, and the main key value block of the webpage contains the main content information of the page, the information of the query and the information of the main key value block are very likely to be very similar, the body value of the main key value block may be identified based on the information included in the query, i.e., the target word. In the body value identification based on query, the input includes the word segmentation result and corresponding word frequencies of the query. With the above identification strategy, when there is a node satisfying the condition, the identified query node is given, and the text data corresponding to the query node is used as the body value of the main key value block, otherwise the identification fails.

The purpose of setting that the page location of the query node and the page location of the target key value block satisfy the preset distance condition is ensuring the query node to be not so far away from the target key value block, reducing the rate of error identification.

Alternatively, the target word may be determined according to the word frequencies of respective words in the at least one query associated with the webpage source data as follows. Word segmentation is performed on the at least one query, and the word frequencies of respective words are calculated. When it is determined that at least two words satisfy a word concatenation condition according to the word frequency calculation result, the at least two words are concatenated to generate a new word, and the word frequency corresponding to the new word is updated. When it is determined that the word frequency difference between the first word and the second word determined by ranking respective words according to the word frequencies, satisfies a preset word frequency threshold condition, the first word is used as the target word.

As an example, the word segmentation may be performed on respective queries by using a word segmentation tool, and then the word frequencies of respective words are calculated according to the number of occurrences of respective words. When both the word frequencies of two words are less than the preset lowest threshold, the two words are concatenated to generate a new word, and the word frequencies corresponding to respective words are recalculated. Finally, the words are ranked according to the word frequencies, and it is determined whether the word frequency difference between the word having the highest word frequency and the word having the second-highest word frequency is greater than the preset threshold, i.e., satisfies the word frequency threshold condition. When the result is yes, it indicates that the word having the highest word frequency is the word that can represent the main content of the query, and this word is used as the target word to compare with the content in the main key value block, thereby finally determining the body value corresponding to the main key value block.

Figure 1C:
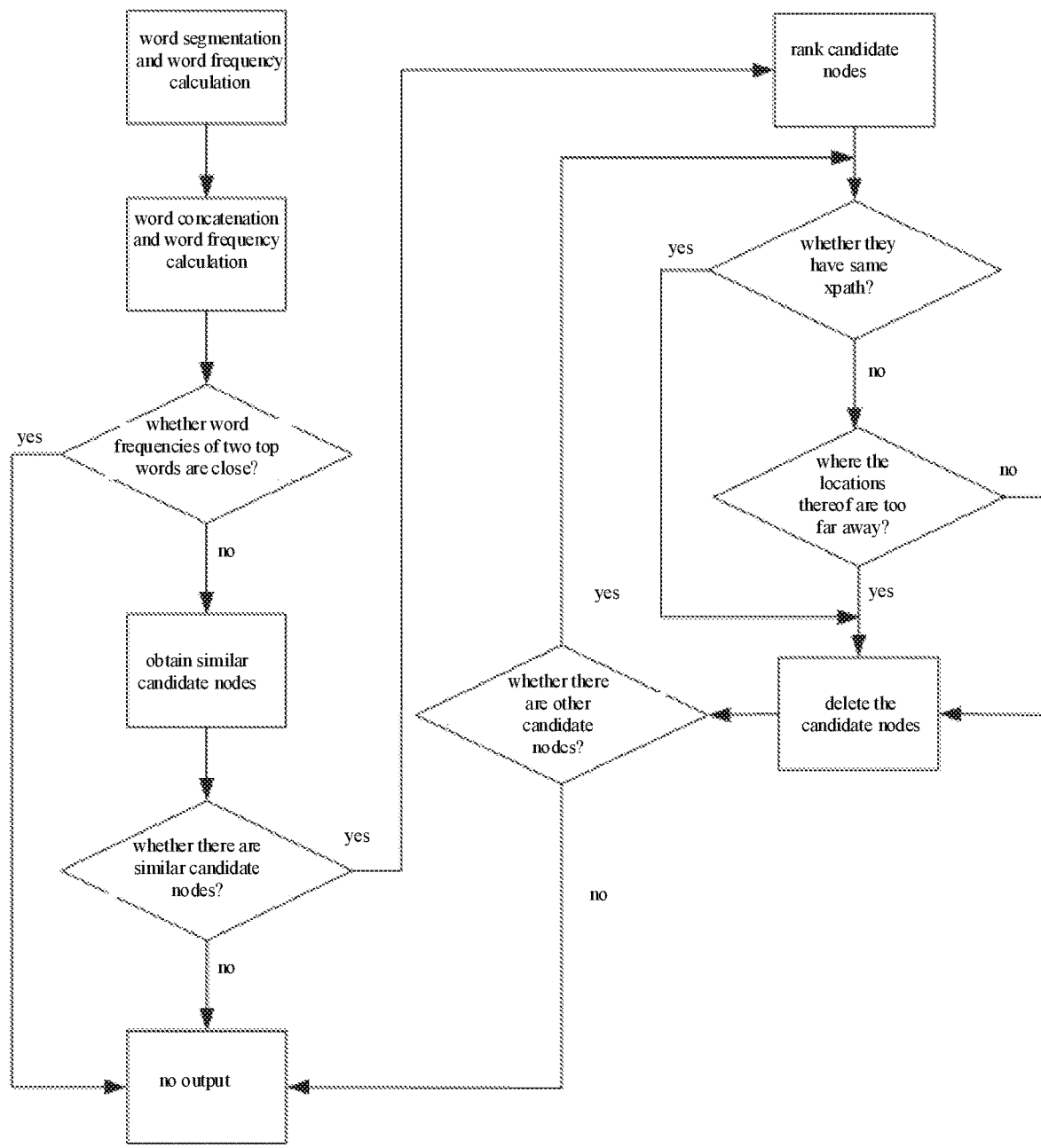
FIG. 1c is a flow chart illustrating a query-based method for identifying a body value applicable to Embodiment 1 of the present disclosure.

For convenience of understanding, the query-based body value identification procedure may be expressed by a specific flow chart. As illustrated in FIG. 1c, in detail, the word segmentation may be performed on the query first to calculate the word frequencies. Then, word concatenation is performed, and word frequencies are recalculated. It is determined whether the word frequencies corresponding to the two words having the highest word frequencies are close to each other, if yes, the body value cannot be identified based on the query, and thus there is no output, and if no, the nodes similar to the word having the highest word frequency in the webpage are obtained as candidate nodes. It is determined whether there are such candidate nodes, if no, there is no output, and the method fails, and if yes, the candidate nodes are sequenced, and then it is determined in sequence, whether the candidate node and the target key value block currently processed have the same xpath, and whether the location of the candidate node in the webpage interface is far from the location of the target key value block in the webpage interface. When one of them is yes, the candidate node is deleted, and when both are no, the candidate node is determined as the node where the body value of the target key value block is located, and the text data corresponding to the node is the body value of the target key value block.

Alternatively, the body values corresponding to the at least one key value block may be identified from the webpage source data as follows. The target site corresponding to the target webpage is determined according to the URL of the target webpage, prestored at least one candidate template corresponding to the target site is obtained, and the body value corresponding to the key value block currently processed is identified based on the candidate template. The candidate template in the target site is generated based on identification result of performing key value pair identification on a plurality of webpages of the target site.

As an example, the body value identification base on site template refers to identifying the body value corresponding to the key value block according to site template data, which mainly includes two steps: obtaining the candidate template from the site templates, and identifying the body value by using the candidate template. The target site may be the site to which the target webpage belongs. Since the URL of each webpage carries information of the site where the webpage is located, the target site corresponding to the target webpage may be identified according to the URL. In detail, some sites may be prestored with corresponding identification templates, the body value corresponding to the key value block may be obtained by directly calling the template.

At block S140, the entity relationship data corresponding to the target webpage is generated according to the key value blocks and the body values corresponding to the key value blocks.

In this embodiment, the key value block and its body value may include a plurality of S-KV data, in which S is the body value of the key value block, K is the key name of the key value pair in the key value block, and V is the key value of the key value pair in the key value block. Since there is correspondence relationship between the S-KV data and the entity relationship data, the key value block in the target webpage may be split, and recombined with the corresponding body value, to generate the entity relationship data corresponding to the target webpage.

Alternatively, the entity relationship data corresponding to the target webpage may be generated according to the key value blocks and the body values corresponding to the key value blocks as follows. Respective key value pairs included in the key value block are combined with the body value corresponding to the key value block, to construct triplet data. The key name included in the triplet data is used as the subject-object relationship value, and the key value corresponding to the key name is used as the object value, such that the entity relationship data is generated.

As an example, after one key value pair is combined with the body value corresponding to the key value block to which the key value pair belongs, one SPO triplet data is constructed, in which the body value corresponding to the key value block to which the key value pair belongs is used as S in the SPO triplet data, i.e., the body value in the entity relationship data, the key name of the key value pair is used as P in the SPO triplet data, i.e., the entity relationship value in the entity relationship data, and the key value of the key value pair is used as O in the SPO triplet data, i.e., the object value in the entity relationship data, such that the entity relationship data is generated.

With the technical solution in this embodiment, by obtaining the webpage source data corresponding to the target webpage, and by identifying the at least one key value block included in the webpage source data and the body values corresponding to respective key value blocks, the entity relationship data corresponding to the target webpage may be generated according to the respective key value blocks and their body values. Since the entity relationship is identified from the webpage source data, it is not limited by the webpage type, the webpage structure, the site and the like, and the entity relationship data may be extracted from the webpage automatically, which does not need much human maintenance. Moreover, a great amount of entity relationship data may be obtained while performing extraction from the huge amount of Internet webpages, thereby improving the webpage universality, reducing labor cost, and improving the output quantity of the entity relationship data.

Figure 1D:
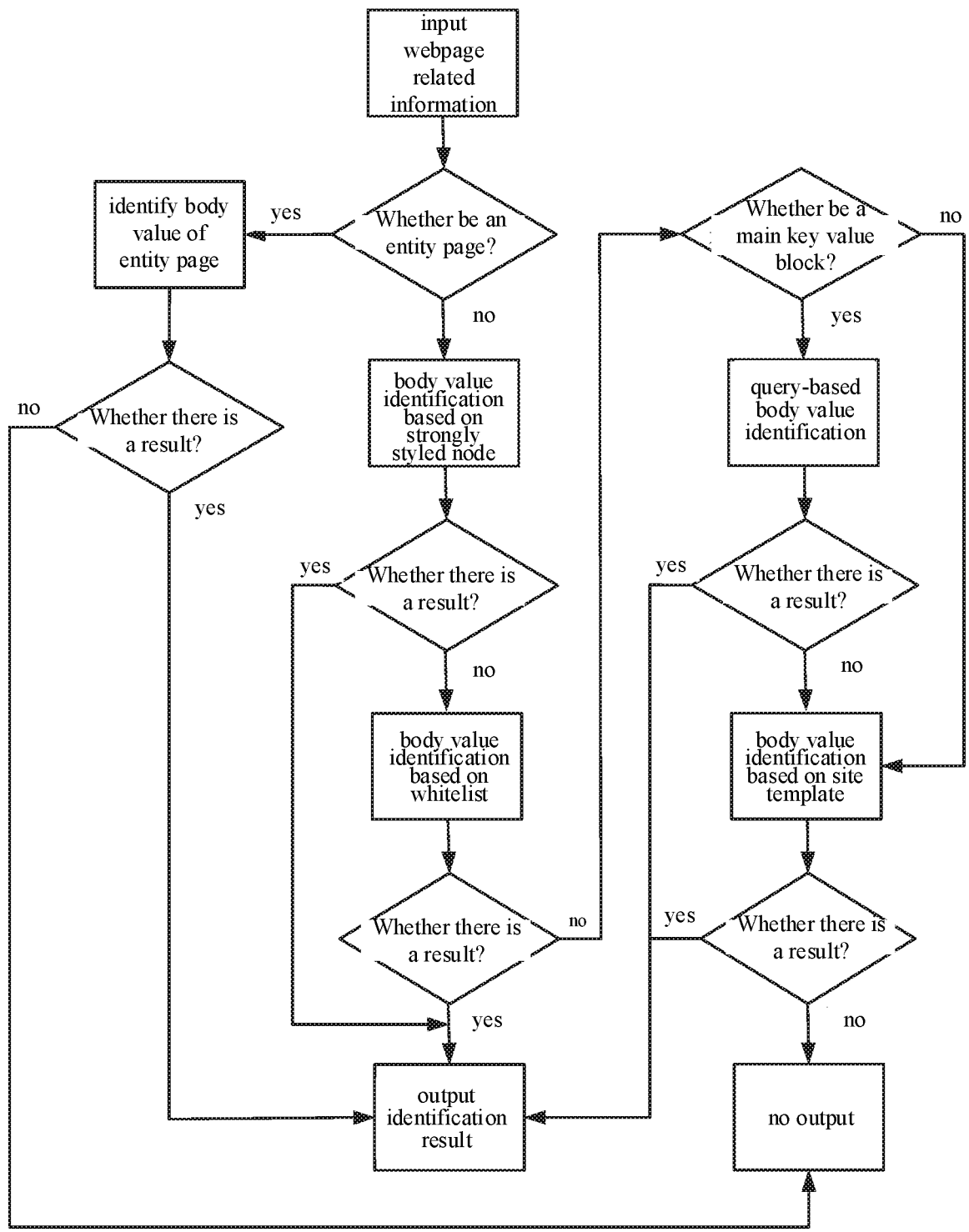
FIG. 1d is a flow chart illustrating a method for identifying a body value applicable to Embodiment 1 of the present disclosure.

Alternatively, based on the above embodiment, one or more method may be selected from the above five methods for identifying the body value of the main key value block, to perform the body value identification. When multiple methods are used to perform the identification, the multiple methods may be combined based on a certain order for synthetic identification, thereby improving the accuracy and success rate of identifying the body value. For example, the five methods are combined, and as illustrated in FIG. 1d, the body value of the key value block is identified. The specific order is: body value identification based on entity page, body value identification based on strongly styled node, body value identification based on whitelist, query-based body value identification, and body value identification based on site template. For the entity page, only the first method may be used to identify the body value. If the body value is identified, the corresponding result is outputted, and if the body value is not identified, there is no output, i.e., it is determined that the body value of the key value block is not identified successfully. For the body value identification in the non-entity page, if the body value is identified by any identification method other than the first identification method, i.e., if there is an identification result, the result is outputted, otherwise, the next identification method is used for identification, and it is determined that the body value of the key value block is not identified successfully until it is finally determined that no body value is identified.

Embodiment 2

Figure 2A:
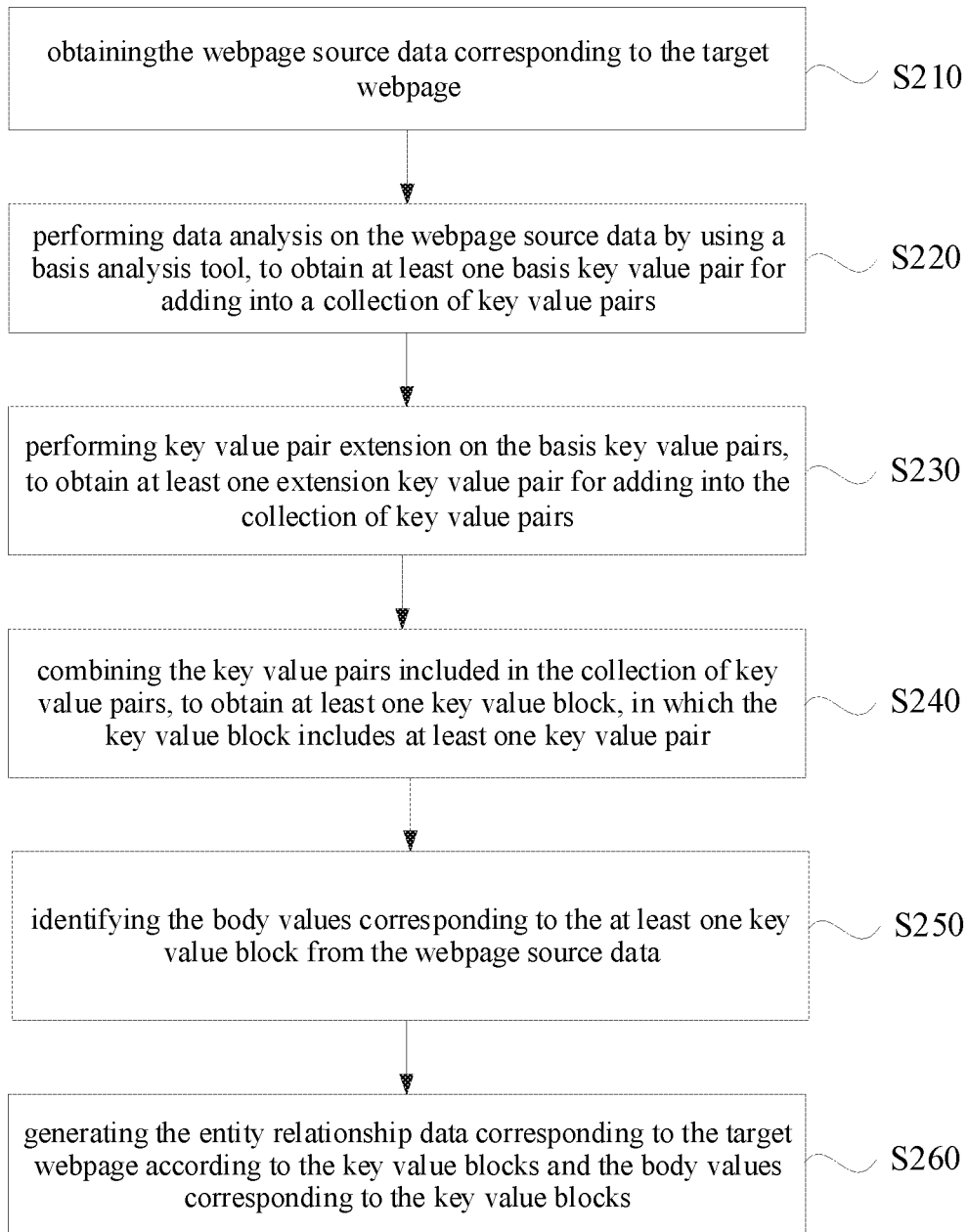
FIG. 2a is a flow chart illustrating a method for generating entity relationship data provided in Embodiment 2 of the present disclosure.

FIG. 2a is a flow chart illustrating a method for generating entity relationship data provided in Embodiment 2 of the present disclosure. The method is further optimized on the basis of Embodiment 1. In this embodiment, identifying at least one key value block from the webpage source data is optimized by: performing data analysis on the webpage source data by using a basis analysis tool, to obtain at least one basis key value pair for adding into a collection of key value pairs; performing key value pair extension on the basis key value pairs, to obtain at least one extension key value pairs for adding into the collection of key value pairs; and combing the key value pairs included in the collection of key value pairs, to obtain the at least one key value block.

Accordingly, the method in this embodiment includes the following.

At block S210, the webpage source data corresponding to the target webpage is obtained.

At block S220, data analysis is performed on the webpage source data by using a basis analysis tool, to obtain at least one basis key value pair for adding into a collection of key value pairs.

The basis analysis tool may be a KV analysis tool, and the purpose of performing data analysis on the webpage source data corresponding to the target webpage is obtaining at least one key value pair included in the webpage source data as the basis key value pairs, and adding the basis key value pairs into the preset collection of key value pairs.

For example, since some analysis tools may automatically identify some KV type of data in the webpage source data, the basis analysis tool may be used to roughly identify key value pairs included in the target webpage.

As an example, the mars analysis tool may be used to analyze the ulpack data, and in the analysis result, text data describing KV form in the webpage, or simply, text data corresponding to <table> label may be extracted as the basis key value pair.

At block S230, key value pair extension is performed on the basis key value pairs, to obtain at least one extension key value pair for adding into the collection of key value pairs.

In this embodiment, since the basis analysis tool has some limitations and can merely obtain limited key value pairs from the data analysis result, it is required to further identify other key value pairs included in the target webpage on the basis of the obtained basis key value pairs.

The purpose of performing the key value pair extension is finding content that cannot be analyzed by the basis analysis tool. The way for performing the key value pair extension includes, but is not limited to, extending KV type text having the same xpath in the analysis result, and extending the KV type text in the specific HTML label.

Alternatively, performing the key value pair extension on the basis key value pairs to obtain at least one extension key value pair for adding into the collection of key value pairs may be implemented as follows. A basis xpath of a basis node matching the basis key value pair is obtained from the webpage source data, and an extension node whose xpath is same as the basis xpath is found, and the text data corresponding to the extension node is obtained as the extension key value pair. Additionally or alternatively, a basis html label of a basis node matching the basis key value pair is obtained from the webpage source data, at least one extension html label is determined according to the basis html label, extension nodes matching the extension html labels are found in the webpage source data, and the text data corresponding to the extension nodes are obtained as the extension key value pairs.

In the first way, since it is very likely to identify other key value pairs in the xpath of the node where the identified basis key value pair is located, it is possible to extend the key value pairs by obtaining text data corresponding to other nodes in the xpath of the node where the basis key value pair is located, obtaining more key value pairs.

In the second way, since each webpage source data includes multiple html labels, such as <h1> label, <strong> label, and <table> label, it is very likely to exist other key value pairs under the html label corresponding to the identified basis key value pair, and thus, it is possible to extend the key value pairs by obtaining the text data corresponding to all the matching nodes under the html label corresponding to the basis key value pair (i.e., the basis html label).

The above two ways may be used either alone, or in combination, which is not limited here.

In an alternative implementation of the embodiment, alternatively, after performing key value pair extension on the basis key value pairs to obtain at least one extension key value pair for adding into the collection of key value pairs, deduplication process may be performed on the key value pairs included in the collection of key value pairs. In detail, since the extended key value pairs may be same as the key value pairs identified by tools, or node information may conflict with each other, it needs to perform integration and deduplication process on the extension result.

In a specific example, the confliction of node information may include the confliction of location information (location of nodes in the webpage), or confliction of text information, or the like. For example, the location of the key value pair identified by tools may have a deviation, and resulting the confliction of location information corresponding to the same key value pair. For another example, in two or more key value pairs identified, the same key name corresponds to different key values, resulting the confliction of text information.

At block S240, the key value pairs included in the collection of key value pairs are combined, to obtain at least one key value block, in which the key value block includes at least one key value pair.

In this embodiment, in order to reduce the trouble of identifying the body value for each key value pair and improve the efficiency of generating the entity relationship data, all the identified key value pairs are combined according to a certain combination rule, such that in the subsequent body value identification, identification may be performed in a unit of key value block, i.e., one body value is identified for each key value block. In detail, for respective key value blocks, same amount of key value pairs may be assigned, or different amounts of key value pairs may be assigned, which is not limited here.

Alternatively, the key value pairs included in the collection of key value pairs may be combined as follows, to obtain at least one key value block. The page location of each key value pair in the collection of key value pairs is positioned in the target webpage, and at least two key value pairs having continuous page locations are combined into the same key value block.

For example, the multiple key value pairs whose page locations in the target webpage are continuous (i.e., there is no other text between the page locations of the key value pairs) are combined into one key value block. For each webpage, one or more key value blocks may be obtained, in which the key value block having the most key value pairs is the main key value block.

Alternatively, after combining the key value pairs included in the collection of key value pairs to obtain the at least one key value block, the method further includes: performing filtering process on the key value pairs included in the at least one key value block according to a key value pair filtering rule; and performing filtering process on the at least one key value block according to a key value block filtering rule.

For example, the key value filtering includes two granularities of key value pair granularity and key value block granularity. In detail, the filtering of key value pair granularity may be performed first, and then the filtering of key value block granularity is performed. The benefit of the filtering is that, some invalid key value pairs or key value blocks may be deleted, such that the efficiency and reliability of the entity relationship data may be improved.

The filtering of key value pair granularity refers to performing filtering according to the length and the text type of the key value pair and the symbols in the key value pair. For example, when the key name or the key value of the key value pair is too long, the key value pair is considered invalid, and needs to be filtered out. For another example, when the text corresponding to the key value pair includes symbols that cannot be identified, or all are the symbols, the key value pair is considered invalid.

In addition, the filtering of key value block granularity mainly aims at filtering out key value blocks which do not have entity relationship meaning, for example, text without practical meaning, such as "friendly reminder: xxx", and text of a nouns explanation class, such as "skill A: xxx".

Figure 2B:
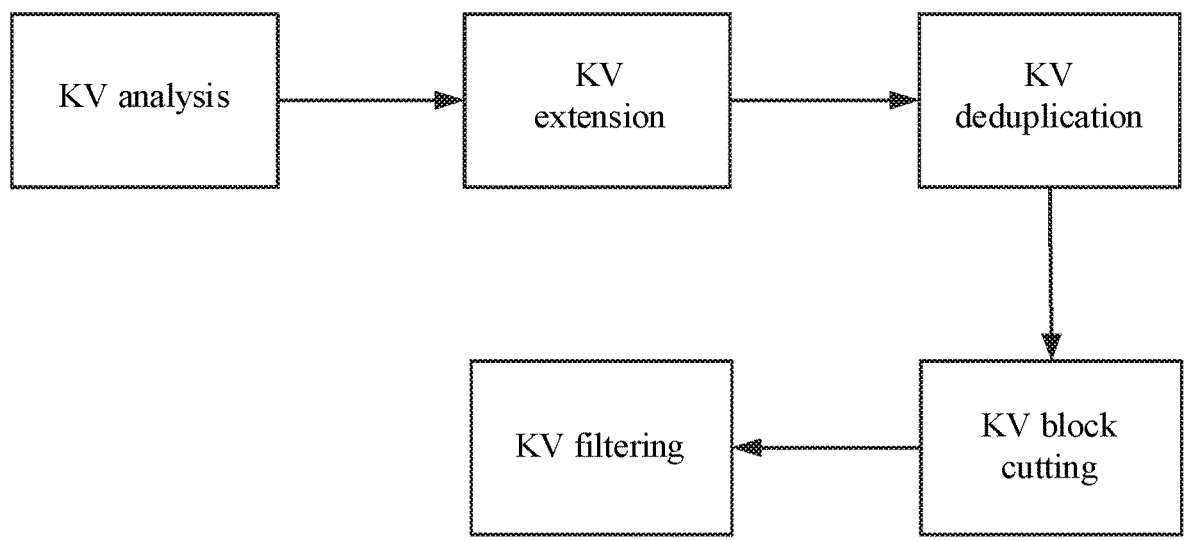
FIG. 2b is a flow chart illustrating a method for identifying a key value block applicable to Embodiment 2 of the present disclosure.

In a practical example, the whole procedure of identifying the key value blocks may be implemented as illustrated in FIG. 2b. First, the webpage content is analyzed by using the mars analysis tool. Then, the KV extension, deduplication, cutting and filtering are performed according to the analyzed KV data and webpage information, to yield the valid KV data in the webpage, which is output in the unit of KV block. The KV block cutting refers to combining the key value pairs.

At block S250, the body values corresponding to the at least one key value block are identified from the webpage source data.

At block S260, the entity relationship data corresponding to the target webpage is generated according to the key value blocks and the body values corresponding to the key value blocks.

With the technical solution of this embodiment, data analysis is performed on the obtained webpage source data corresponding to the target webpage, to obtain at least one basis key value pair; key value pair extension is performed on the basis key value pairs obtained by using the basis analysis tool, and both the basis key value pairs and the extension key value pairs obtained by extension are added into the collection of key value pairs; the key value pairs included in the collection of key value pairs are combined, to obtain at least one key value block; and finally, in combination with the body values corresponding to the at least one key value blocks identified from the webpage source data, the entity relationship data corresponding to the target webpage is generated. By using both the basis key value pairs obtained by analyzing the webpage source data and the extension key value pairs obtained by performing extension on the basis key value pairs, more key value pairs may be obtained for each webpage, such that the huge amount of entity relationship data may be obtained from the huge amount of Internet webpages, which does not only satisfy the requirement of recommending hot entity retrieval, but also better solve the coverage problem of long tail entity.

On the basis of the above embodiments, in order to improve the effectiveness of the finally generated entity relationship data, the key value blocks and the corresponding body values may be filtered. Alternatively, after identifying the body values corresponding to the at least one key value block from the webpage source data, the method may further include: filtering the at least one key value block according to the body values corresponding to the at least one key value block by using at least one statistical check template, and/or using at least one rule check template.

For example, filtering the key value blocks aims to performing quality control on the key value blocks and corresponding body values generated upstream, and mainly includes check based on statistics and check based on rule, to filter out the data which does not satisfy the condition, thereby outputting high-quality key value blocks.

In detail, the statistical check template is mainly used to filter the error that is difficult to solve under single page information, and may perform statistical filtering with two granularities of key value pair and key value block. Moreover, the rule check template mainly processes S-KV data, i.e., the key value pair (or key value block) based on a man-made rule, and filters S and KV separately.

Alternatively, the method may further include: obtaining the identified body values corresponding to the key value blocks respectively from respective webpages in the target site corresponding to the URL of the target webpage, as body values to be processed; when the number of target body values having the same xpath is greater than a first number threshold, constructing at least one candidate statistical check template according to the xpath of the target body values and the key value blocks corresponding to the target body values; obtaining the key value blocks respectively corresponding to the candidate statistical check templates; when the number of same key value blocks in the multiple key value blocks corresponding to one target candidate statistical check template is greater than a second number threshold, the target candidate statistical check template is deleted from the candidate statistical check templates, to obtain the statistical check template.

As an example, the statistical check template is constructed by following two check steps. The first step is S-xpath level statistical check, i.e., the site where the URL is and the xpath of the body value identified for the URL are sued as key to perform merging, and a plurality of initial templates are established according to the merging result, and the actual S-KV identification result is matched with each initial template to filter out the initial templates not satisfying the condition, obtaining candidate statistical check templates. The second step is S xpath-KV block level statistical check template, i.e., on the basis of candidate statistical check templates, S xpath (i.e., xpath of the body value) and xpath of the corresponding KV block (i.e., xpath of the key value block) are used as key to perform merging, and after the merging, multiple templates whose KV are identical under multiple URLs are deleted, to obtain the final statistical check template. The finally obtained statistical check template is mainly used to filter KV data included in common information of a sidebar or a bottom bar of the webpage.

Figure 2C:
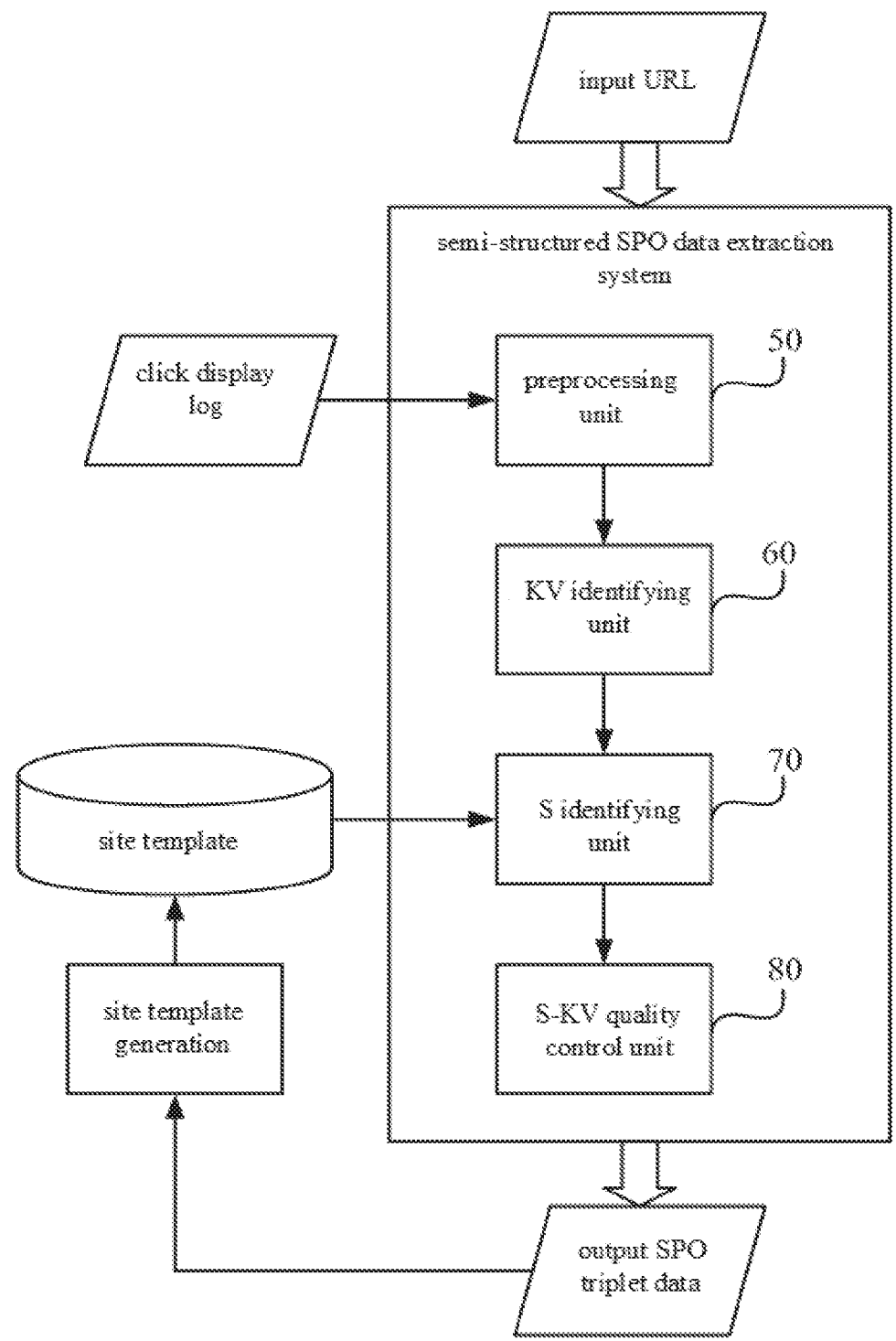
FIG. 2c is a schematic diagram of a semi-structured SPO data extraction system applicable to Embodiment 2 of the present disclosure.

On the basis of above embodiments, a semi-structured SPO data extraction system may be constructed, as illustrated in FIG. 2c. The system includes a preprocessing unit 50, a KV identifying unit 60, a S identifying unit 70, and a S-KV quality control unit 80. The preprocessing unit 50 is configured to pre-process the input URL of the webpage, to obtain webpage source data. The KV identifying unit 60 is configured to identify key value blocks in the webpage source data. The S identifying unit 70 is configured to identify body values in the webpage source data. The S-KV quality control unit 80 is configured to filter out S-KV data not satisfying the requirement, thereby outputting the SPO triplet data satisfying the requirement.

The semi-structured SPO data extraction system aims at implementing a system which extracts information expressed in a form of KV from the webpage, and organize it into the data in the form of triple. That is, given the URL of the target webpage as input, the system will, with respect to the target webpage, identify the corresponding entity (S) for the entity relationship (P) and the entity attribute value (O) identified in the binary form, and then outputs it in the form of SPO triplets, thereby realizing automatically extracting the SPO data in any kind of webpage, i.e., the entity relationship data. As illustrated in FIG. 2c, after inputting the URL into the semi-structured SPO data extraction system, corresponding external data, such as the click display log required in the preprocessing procedure, and the site template required in the body value identification based on site temple are used, and finally the corresponding SPO triplet data is obtained.

Embodiment 3

Figure 3:
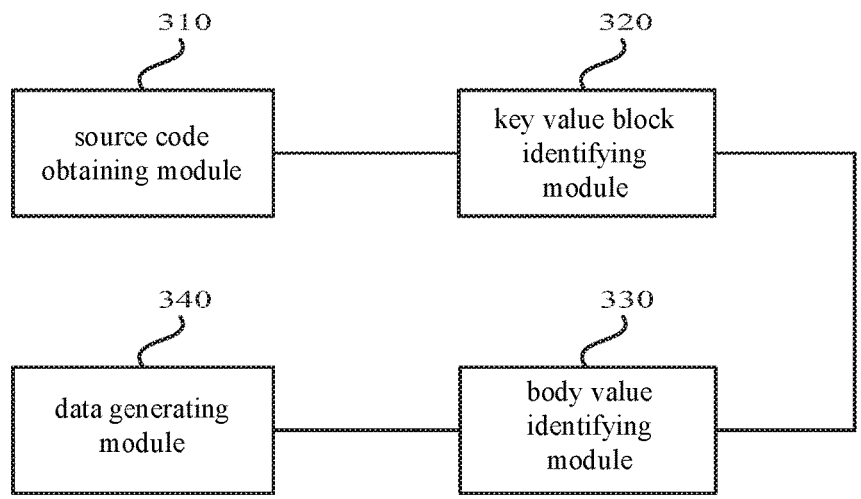
FIG. 3 is a block diagram of an apparatus for generating entity relationship data provided in Embodiment 3 of the present disclosure.

FIG. 3 is a block diagram illustrating an apparatus for generating entity relationship data provided in Embodiment 3 of the present disclosure. Referring to FIG. 3, the apparatus for generating entity relationship data includes a source code obtaining module 310, a key value block identifying module 320, a body value identifying module 330, and a data generating module 340. In the following, respective modules are described in detail.

The source code obtaining module 310 is configured to obtain webpage source data corresponding to a target webpage.

The key value block identifying module 320 is configured to identify at least one key value block from the webpage source data, wherein the key value block comprises at least one key value pair.

The body value identifying module 330 is configured to identify body values corresponding to the at least one key value block from the webpage source data.

The data generating module 340 is configured to generate entity relationship data corresponding to the target webpage according to the key value blocks and the body values corresponding to the key value blocks.

This embodiment provides an apparatus for generating entity relationship data. By obtaining the webpage source data corresponding to the target webpage, and by identifying the at least one key value block included in the webpage source data and the body values corresponding to respective key value blocks, the entity relationship data corresponding to the target webpage may be generated according to the respective key value blocks and their body values. Since the entity relationship is identified from the webpage source data, it is not limited by the webpage type, the webpage structure, the site and the like, and the entity relationship data may be extracted from the webpage automatically, which does not need much human maintenance. Moreover, a great amount of entity relationship data may be obtained while performing extraction from the huge amount of Internet webpages, thereby improving the webpage universality, reducing labor cost, and improving the output quantity of the entity relationship data.

Alternatively, the key value block identifying module 320 may include a basis key value obtaining sub-module, an extension key value obtaining sub-module, and a key value block determining sub-module.

The basis key value obtaining sub-module is configured to perform data analysis on the webpage source data by using a basis analysis tool, to obtain at least basis key value pair for adding into a collection of key value pairs.

The extension key value obtaining sub-module is configured to perform key value pair extension on the basis key value pairs, to obtain at least one extension key value pair for adding into the collection of key value pairs.

The key value block determining sub-module is configured to combine the key value pairs included in the collection of key value pairs, to obtain at least one key value block.

Alternatively, the extension key value obtaining sub-module may be specifically configured to:

obtain a basis xpath of a basis node matching the basis key value pair from the webpage source data, obtain an extension node having a xpath same as the basis xpath, and obtain text data corresponding to the extension node as the extension key value pair; and/or obtain a basis html label of a basis node matching the basis key value pair from the webpage source data, determine at least one extension html label according to the basis html label, search for an extension node matching the extension html label in the webpage source data, and obtain text data corresponding to the extension node as the extension key value pair.

Alternatively, the key value block determining sub-module may be specifically configured to:

position page locations of the key value pairs of the collection of key value pairs in the target webpage; and combine at least two key value pairs having continuous page locations into the same key value block.

alternatively, the key value block identifying module 320 may further include a key value pair filtering sub-module and a key value block filtering sub-module.

The key value pair filtering sub-module is configured to filter the key value pairs included in the at least one key value block according to a key value pair filtering rule.

The key value block filtering sub-module is configured to filter the at least one key value block according to a key value block filtering rule.

Alternatively, the body value identifying module 330 may be specifically configured to:

when a target key value block currently processed is a main key value block, and the webpage source data comprises an entity page node satisfying a first label condition, determine whether the target webpage is an entity page according to an entity page evaluation rule; and when the target webpage is an entity page, determine text data corresponding to the entity page node as the body value of the target key value block, wherein the main key value block is the key value block having the most key value pairs in the at least one key value block corresponding to the webpage source data.

Alternatively, the body value identifying module 330 may be specifically configured to: search for a strongly styled node satisfying a second label condition forwards in the webpage source data, according to a page location of a target key value block currently processed in the target webpage;

when the strongly styled node is found, and a xpath of the strongly styled node is inconsistent with a xpath corresponding to the target key value block, determine text data corresponding to the strongly styled node as the body value of the target key value block.

Alternatively, the body value identifying module 330 may be specifically configured to:

match a key name of the key value pair in a target key value block currently processed with a preset whitelist; and when determining that the key name of the key value pair in the target key value block matches the preset whitelist, obtain a key value corresponding to the key name as the body value of the target key value block.

Alternatively, the apparatus for generating entity relationship data may further include a query obtaining module. The query obtaining module is configured to, after obtaining the webpage source data corresponding to the target webpage, obtain at least one query corresponding to a URL of the target webpage from a click display log of a search engine, and associate the at least one query with the webpage source data.

Accordingly, the body value identifying module 330 may include a word determining sub-module, a node searching sub-module, and a body value determining sub-module.

The word determining sub-module is configured to, when determining that a target key value block currently processed is a main key value block, determine a target word according to word frequencies of respective words in the at least one query associated with the webpage source data.

The node searching sub-module is configured to search for at least one query node from the webpage source data, text data of the at least one query node and the target word satisfying a similarity condition.

The body value determining sub-module is configured to, when a xpath of the query node is different from a xpath corresponding to the target key value block, and a page location of the query node in the target webpage and a page location of the target key value block in the target webpage satisfy a preset distance condition, determine text data of the query node as the body value of the target key value block.

Alternatively, the word determining sub-module may be specifically configured to:

perform word segmentation on the at least one query, and calculate the word frequencies of respective words;

when determining that at least two words satisfy a word concatenation condition according to a word frequency calculation result, concatenate the at least two words to generate a new word, and update the word frequency of the new word; and when a word frequency difference between the first word and the second word determined by ranking the respective words according to the word frequencies satisfies a word frequency threshold condition, determine the first word as the target word.

Alternatively, the body value identifying module 330 may be specifically configured to:

determine a target site corresponding to the target webpage according to a URL of the target webpage;

obtain at least one prestored candidate template corresponding to the target site, and identify the body value corresponding to a key value block currently processed by using the candidate template, wherein the candidate template of the target site is generated according to an identifying result of performing key value pair identification on a plurality of webpages of the target site.

Alternatively, the apparatus for generating entity relationship data may further include a template filtering module. The template filtering module is configured to filter the at least one key value block according to the body values corresponding to the at least one key value block by using at least one statistical check template, and/or by using at least one rule check template.

Alternatively, the apparatus for generating entity relationship data may further include a body value obtaining module, a template constructing module, a key value block obtaining module, and a template determining module.

The body value obtaining module is configured to obtain the body value corresponding to the key value blocks respectively from webpages in the target site corresponding to the URL of the target webpage, as body values to be processed.

The template constructing module is configured to, when a number of target body values having the same xpath exceeds a first number threshold, construct at least one candidate statistical check template according to the xpath of the target body values and the key value blocks corresponding to the target body values.

The key value block obtaining module is configured to obtain the key value blocks corresponding to the candidate statistical check templates.

The template determining module is configured to, when a number of same key value blocks in a plurality of key value bocks corresponding to a target candidate statistical check template exceeds a second number threshold, delete the target candidate statistical check template from the candidate statistical check templates, to obtain the statistical check template.

Alternatively, the data generating module 340 may be specifically configured to: combine respective key value pairs in the key value block with the body value corresponding to the key value block, to construct triplet data; and generate the entity relationship data by using a key name in the triplet data as a subject-object relationship value, and using a key value corresponding to the key name as an object value.

The above apparatus may execute the method provided by any embodiment of the present disclosure, and have corresponding modules and benefit effects of executing the method.

Embodiment 4

Figure 4:
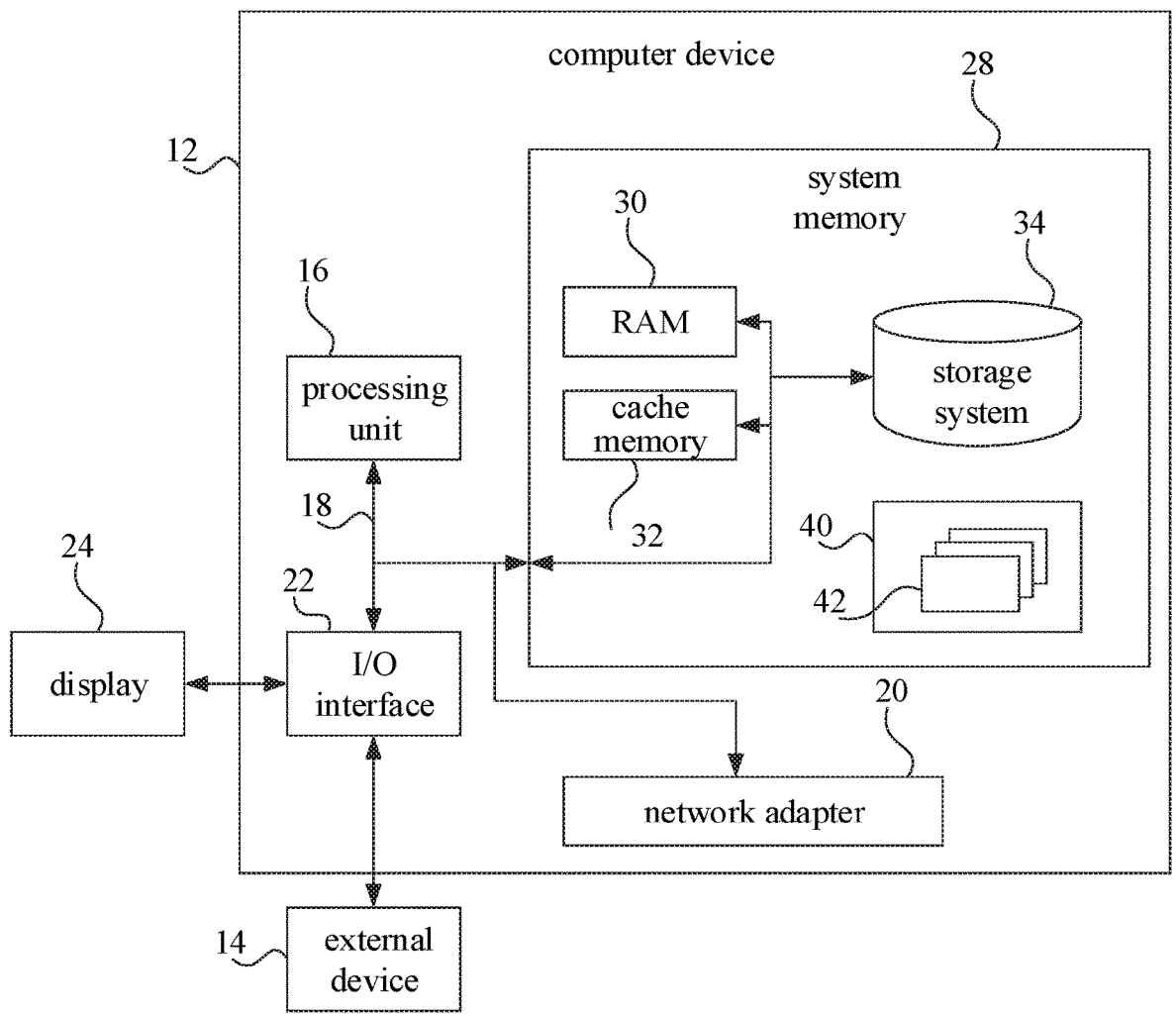
FIG. 4 is a block diagram of a computer device provided in Embodiment 4 of the present disclosure.

FIG. 4 is a schematic diagram illustrating a computer device provided in Embodiment 4 of the present disclosure. FIG. 4 illustrates a block diagram of an exemplary computer device 12 applicable to implement embodiments of the present disclosure. The computer device 12 illustrated in FIG. 4 is only an example, which may not bring any limitation to functions and scope of embodiments of the present disclosure.

As illustrated in FIG. 4, the computer device 12 is embodied in the form of a general-purpose computer device. Components of the computer device 12 may include but not limited to: one or more processors or processing units 16, a system memory 28, and a bus 18 connecting different system components (including the system memory 28 and the processing unit 16).

The bus 18 represents one or more of several bus structures, including a storage bus or a storage controller, a peripheral bus, an accelerated graphics port and a processor or a local bus with any bus structure in the plurality of bus structures. For example, these architectures include but not limited to an ISA (Industry Standard Architecture) bus, a MAC (Micro Channel Architecture) bus, an enhanced ISA bus, a VESA (Video Electronics Standards Association) local bus and a PCI (Peripheral Component Interconnection) bus.

The computer device 12 typically includes various computer system readable mediums. These mediums may be any usable medium that may be accessed by the computer device 12, including volatile and non-volatile mediums, removable and non-removable mediums.

The system memory 28 may include computer system readable mediums in the form of volatile medium, such as a RAM (Random Access Memory) 30 and/or a cache memory 32. The computer device 12 may further include other removable/non-removable, volatile/non-volatile computer system storage mediums. Only as an example, the storage system 34 may be configured to read from and write to non-removable, non-volatile magnetic mediums (not illustrated in FIG. 5, and usually called "a hard disk driver"). Although not illustrated in FIG. 5, a magnetic disk driver configured to read from and write to the removable non-volatile magnetic disc (such as "a diskette"), and an optical disc driver configured to read from and write to a removable non-volatile optical disc (such as a CD-ROM, a DVD-ROM or other optical mediums) may be provided. Under these circumstances, each driver may be connected with the bus 18 by one or more data medium interfaces. The system memory 28 may include at least one program product. The program product has a set of program modules (for example, at least one program module), and these program modules are configured to execute functions of respective embodiments of the present disclosure.

A program/utility tool 40, having a set (at least one) of program modules 42, may be stored in the system memory 28. Such program modules 42 include but not limited to an operating system, one or more application programs, other program modules, and program data. Each or any combination of these examples may include an implementation of a networking environment. The program module 42 usually executes functions and/or methods described in embodiments of the present disclosure.

The computer device 12 may communicate with one or more external devices 14 (such as a keyboard, a pointing device, and a display 24), may further communicate with one or more devices enabling a user to interact with the device, and/or may communicate with any device (such as a network card, and a modem) enabling the computer device 12 to communicate with one or more other computer devices. Such communication may occur via an Input/Output (I/O) interface 22. Moreover, the computer device 12 may further communicate with one or more networks (such as LAN (Local Area Network), WAN (Wide Area Network) and/or public network, such as Internet) via a network adapter 20. As illustrated in FIG. 5, the network adapter 20 communicates with other modules of the computer device 12 via the bus 18. It should be understood that, although not illustrated in FIG. 7, other hardware and/or software modules may be used in combination with the computer device 12, including but not limited to: microcode, device drivers, redundant processing units, external disk drive arrays, RAID (Redundant Array of Independent Disks) systems, tape drives, and data backup storage systems, etc.

The processor 16, by operating programs stored in the system memory 28, executes various function applications and data processing, for example implements a method for generating entity relationship data provided in embodiments of the present disclosure: obtaining webpage source data corresponding to a target webpage; identifying at least one key value block from the webpage source data, wherein the key value block comprises at least one key value pair; identifying body values corresponding to the at least one key value block from the webpage source data; and generating entity relationship data corresponding to the target webpage according to the key value blocks and the body values corresponding to the key value blocks.

Embodiment 5

Embodiment 5 of the present disclosure provides a computer readable storage medium stored thereon with a computer program. When executed by a processor, the computer program is configured to implement a method for generating entity relationship data according to any of embodiments described above: obtaining webpage source data corresponding to a target webpage; identifying at least one key value block from the webpage source data, wherein the key value block comprises at least one key value pair; identifying body values corresponding to the at least one key value block from the webpage source data; and generating entity relationship data corresponding to the target webpage according to the key value blocks and the body values corresponding to the key value blocks.

The computer readable storage medium in embodiments of the present disclosure may employ any combination of one or more computer readable mediums. The computer readable medium may be a computer readable signal medium or a computer readable storage medium. The computer readable storage medium may be, for example, but not limited to an electronic, magnetic, optical, electromagnetic, infrared, or semiconductor system, apparatus or device, or any suitable combination of the foregoing. More specific examples (a non-exhaustive list) of the computer-readable storage medium may include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical memory device, a magnetic memory device, or any appropriate combination of the foregoing. In this document, the computer readable storage medium can be any tangible medium that contains or stores a program. The program can be used by or in conjunction with an instruction execution system, apparatus or device.

The computer readable signal medium may include a data signal transmitted in the baseband or as part of a carrier, in which computer readable program codes are carried. The transmitted data signal may employ a plurality of forms, including but not limited to an electromagnetic signal, a light signal or any suitable combination thereof. The computer readable signal medium may further be any computer readable medium other than the computer readable storage medium. The computer readable medium may send, propagate or transmit programs configured to be used by or in combination with an instruction execution system, apparatus or device.

The program codes included in the computer readable medium may be transmitted by any appropriate medium, including but not limited to wireless, electric wire, optical cable, RF (Radio Frequency), or any suitable combination of the foregoing.

The computer program codes for executing operations of the present disclosure may be programmed using one or more programming languages or the combination thereof. The programming languages include object-oriented programming languages, such as Java, Smalltalk, C++, and further include conventional procedural programming languages, such as the C programming language or similar programming languages. The program codes may be executed entirely on a user computer, partly on the user computer, as a stand-alone software package, partly on the user computer and partly on a remote computer, or entirely on the remote computer or server. In the scenario involving the remote computer, the remote computer may be connected to the user computer through any type of network, including a local area network (LAN) or a wide area network (WAN), or may be connected to an external computer (for example, through the Internet using an Internet Service Provider).

The above is only an optimal embodiment of the present disclosure, but the protection scope of the present disclosure is not limited to this. It should be understood by the skilled in the art that, the present disclosure may have any modifications and variations. Any changes, alternatives and modifications made within spirit and principles of the present disclosure should be contained in the protection scope of the present disclosure.

The invention claimed is:

1. A method for generating entity relationship data, comprising:
obtaining webpage source data corresponding to a target webpage;
identifying at least one key value block from the webpage source data, wherein the key value block comprises at least one key value pair;
identifying body values corresponding to the at least one key value block from the webpage source data; and
generating entity relationship data corresponding to the target webpage according to the key value blocks and the body values corresponding to the key value blocks;
after obtaining the webpage source data corresponding to the target webpage, the method further comprising:
obtaining at least one query corresponding to a URL of the target webpage from a click display log of a search engine, and associating the at least one query with the webpage source data;
wherein, identifying body values corresponding to the at least one key value block from the webpage source data comprises:
when determining that a target key value block currently processed is a main key value block, determining a target word according to word frequencies of respective words in the at least one query associated with the webpage source data;
searching for at least one query node from the webpage source data, text data of the at least one query node and the target word satisfying a similarity condition;
when a xpath of the query node is different from a xpath corresponding to the target key value block, and a page location of the query node in the target webpage and a page location of the target key value block in the target webpage satisfy a preset distance condition, determining text data of the query node as the body value of the target key value block.

2. The method according to claim 1, wherein identifying at least one key value block from the webpage source data comprises:
performing data analysis on the webpage source data by using a basis analysis tool, to obtain at least basis key value pair for adding into a collection of key value pairs;
performing key value pair extension on the basis key value pairs, to obtain at least one extension key value pair for adding into the collection of key value pairs; and
combining the key value pairs included in the collection of key value pairs, to obtain at least one key value block.

3. The method according to claim 2, wherein performing key value pair extension on the basis key value pairs, to obtain at least one extension key value pair for adding into the collection of key value pairs, comprises:
obtaining a basis xpath of a basis node matching the basis key value pair from the webpage source data, obtaining an extension node having a xpath same as the basis xpath, and obtaining text data corresponding to the extension node as the extension key value pair; and/or
obtaining a basis html label of a basis node matching the basis key value pair from the webpage source data, determining at least one extension html label according to the basis html label, searching for an extension node matching the extension html label in the webpage source data, and obtaining text data corresponding to the extension node as the extension key value pair.

4. The method according to claim 2, wherein combining the key value pairs included in the collection of key value pairs, to obtain at least one key value block comprises:
positioning page locations of the key value pairs of the collection of key value pairs in the target webpage; and
combining at least two key value pairs having continuous page locations into the same key value block.

5. The method according to claim 2, after combining the key value pairs included in the collection of key value pairs, to obtain at least one key value block, further comprising:
filtering the key value pairs included in the at least one key value block according to a key value pair filtering rule; and
filtering the at least one key value block according to a key value block filtering rule.

6. The method according to claim 1, wherein identifying body values corresponding to the at least one key value block from the webpage source data further comprises:
when a target key value block currently processed is a main key value block, and the webpage source data comprises an entity page node satisfying a first label condition, determining whether the target webpage is an entity page according to an entity page evaluation rule; and
when the target webpage is an entity page, determining text data corresponding to the entity page node as the body value of the target key value block,
wherein the main key value block is the key value block having the most key value pairs in the at least one key value block corresponding to the webpage source data.

7. The method according to claim 1, wherein identifying body values corresponding to the at least one key value block from the webpage source data further comprises:
searching for a strongly styled node satisfying a second label condition forwards in the webpage source data, according to a page location of a target key value block currently processed in the target webpage;
when the strongly styled node is found, and a xpath of the strongly styled node is inconsistent with a xpath corresponding to the target key value block, determining text data corresponding to the strongly styled node as the body value of the target key value block.

8. The method according to claim 1, wherein identifying body values corresponding to the at least one key value block from the webpage source data further comprises:
matching a key name of the key value pair in a target key value block currently processed with a preset whitelist;
when determining that the key name of the key value pair in the target key value block matches the preset whitelist, obtaining a key value corresponding to the key name as the body value of the target key value block.

9. The method according to claim 1, wherein determining the target word according to word frequencies of respective words in the at least one query associated with the webpage source data comprises:
performing word segmentation on the at least one query, and calculating the word frequencies of respective words;
when determining that at least two words satisfy a word concatenation condition according to a word frequency calculation result, concatenating the at least two words to generate a new word, and updating the word frequency of the new word; and
when a word frequency difference between the first word and the second word determined by ranking the respective words according to the word frequencies satisfies a word frequency threshold condition, determining the first word as the target word.

10. The method according to claim 1, wherein identifying body values corresponding to the at least one key value block from the webpage source data further comprises:
determining a target site corresponding to the target webpage according to a URL of the target webpage;
obtaining at least one prestored candidate template corresponding to the target site, and identifying the body value corresponding to a key value block currently processed by using the candidate template,
wherein the candidate template of the target site is generated according to an identifying result of performing key value pair identification on a plurality of webpages of the target site.

11. The method according to claim 1, after identifying the body values corresponding to the at least one key value block from the webpage source data, further comprising:
filtering the at least one key value block according to the body values corresponding to the at least one key value block by using at least one statistical check template, and/or by using at least one rule check template.

12. The method according to claim 11, further comprising:
obtaining the body value corresponding to the key value blocks respectively from webpages in the target site corresponding to the URL of the target webpage, as body values to be processed;
when a number of target body values having the same xpath exceeds a first number threshold, constructing at least one candidate statistical check template according to the xpath of the target body values and the key value blocks corresponding to the target body values;

obtaining the key value blocks corresponding to the candidate statistical check templates;

when a number of same key value blocks in a plurality of key value bocks corresponding to a target candidate statistical check template exceeds a second number threshold, deleting the target candidate statistical check template from the candidate statistical check templates, to obtain the statistical check template.

13. The method according to claim 1, wherein generating the entity relationship data corresponding to the target webpage according to the key value blocks and the body values corresponding to the key value blocks comprises:

combining respective key value pairs in the key value block with the body value corresponding to the key value block, to construct triplet data; and generating the entity relationship data by using a key name in the triplet data as a subject-object relationship value, and using a key value corresponding to the key name as an object value.

14. An apparatus for generating entity relationship data, comprising:

a processor; and a memory, configured to store instructions executable by the processor, wherein the processor is configured to:

obtain webpage source data corresponding to a target webpage;

identify at least one key value block from the webpage source data, wherein the key value block comprises at least one key value pair;

identify body values corresponding to the at least one key value block from the webpage source data; and generate entity relationship data corresponding to the target webpage according to the key value blocks and the body values corresponding to the key value blocks;

after obtaining the webpage source data corresponding to the target webpage, the processor is further configured to:

obtaining at least one query corresponding to a URL of the target webpage from a click display log of a search engine, and associating the at least one query with the webpage source data;

wherein, the processor is configured to identify body values corresponding to the at least one key value block from the webpage source data by:

when determining that a target key value block currently processed is a main key value block, determining a target word according to word frequencies of respective words in the at least one query associated with the webpage source data;

searching for at least one query node from the webpage source data, text data of the at least one query node and the target word satisfying a similarity condition;

when a xpath of the query node is different from a xpath corresponding to the target key value block, and a page location of the query node in the target webpage and a page location of the target key value block in the target webpage satisfy a preset distance condition, determining text data of the query node as the body value of the target key value block.

15. A computer readable storage medium having a computer program stored thereon, wherein the computer program is configured to implement a method for generating entity relationship data when executed by a processor, the method comprising:

obtaining webpage source data corresponding to a target webpage;

identifying at least one key value block from the webpage source data, wherein the key value block comprises at least one key value pair;

identifying body values corresponding to the at least one key value block from the webpage source data; and generating entity relationship data corresponding to the target webpage according to the key value blocks and the body values corresponding to the key value blocks;

after obtaining the webpage source data corresponding to the target webpage, the method further comprising:

obtaining at least one query corresponding to a URL of the target webpage from a click display log of a search engine, and associating the at least one query with the webpage source data;

wherein, identifying body values corresponding to the at least one key value block from the webpage source data comprises:

when determining that a target key value block currently processed is a main key value block, determining a target word according to word frequencies of respective words in the at least one query associated with the webpage source data;

searching for at least one query node from the webpage source data, text data of the at least one query node and the target word satisfying a similarity condition;

when a xpath of the query node is different from a xpath corresponding to the target key value block, and a page location of the query node in the target webpage and a page location of the target key value block in the target webpage satisfy a preset distance condition, determining text data of the query node as the body value of the target key value block.

* * * * *